(12) United States Patent
Jun (10) Patent No.: US 9,992,178 B2
(45) Date of Patent: Jun. 5, 2018

(54) METHOD, APPARATUS AND SYSTEM FOR DYNAMICALLY CONTROLLING SECURE VEHICLE COMMUNICATION BASED ON IGNITION

(71) Applicant: Hyundai Motor Company, Seoul (KR)

(72) Inventor: Sung Hwan Jun, Incheon (KR)

(73) Assignee: Hyundai Motor Company, Seoul (KR)

( * ) Notice: Subject to any disclaimer, the term of this patent is extended or adjusted under 35 U.S.C. 154(b) by 233 days.

(21) Appl. No.: 14/932,286

(22) Filed: Nov. 4, 2015

(65) Prior Publication Data

US 2017/0070488 A1    Mar. 9, 2017

(30) Foreign Application Priority Data

Sep. 9, 2015  (KR) .......................... 10-2015-0127356

(51) Int. Cl.
- *H04L 29/06* (2006.01)
- *H04L 29/08* (2006.01)
- *H04L 9/30* (2006.01)

(52) U.S. Cl.
CPC ............ *H04L 63/0471* (2013.01); *H04L 9/30* (2013.01); *H04L 67/12* (2013.01)

(58) Field of Classification Search
CPC ........ H04L 63/0471; H04L 9/30; H04L 67/12
USPC ....................................................... 713/153
See application file for complete search history.

(56) References Cited

U.S. PATENT DOCUMENTS

| 6,166,653 | A | 12/2000 | Schuimeyer et al. |
| 2003/0147534 | A1* | 8/2003 | Ablay ................... H04L 9/3271 |
| | | | 380/270 |
| 2007/0043828 | A1* | 2/2007 | Famolari ............... H04L 51/043 |
| | | | 709/219 |
| 2010/0098095 | A1* | 4/2010 | Kato .................... H04L 12/4625 |
| | | | 370/401 |
| 2013/0219170 | A1* | 8/2013 | Naitou ................ H04L 63/0428 |
| | | | 713/153 |
| 2015/0172298 | A1* | 6/2015 | Otsuka .................. H04L 63/123 |
| | | | 726/30 |

(Continued)

FOREIGN PATENT DOCUMENTS

| JP | 2005-203882 A | 7/2005 |
| JP | 2006-295426 A | 10/2006 |

(Continued)

OTHER PUBLICATIONS

Cho, A-Ram et al., "A Message Authentication and Key Distribution Mechanism Secure Against CAN bus Attack", Division of Information Security, Korea University, English Abstract, 12 pages.

*Primary Examiner* — Baotran N To (74) *Attorney, Agent, or Firm* — Mintz Levin Cohn Ferris Glovsky and Popeo, P.C.; Peter F. Corless (57) ABSTRACT

A method of controlling secure vehicle communication in a vehicle gateway includes: detecting whether a vehicle is started; generating a new public key for each network connected to the vehicle gateway for message encryption upon detecting that the vehicle is started; transmitting a first message including the new public key; allocating a new identification (ID) to each controller connected to the vehicle gateway with reference to a stored routing table for message routing between controllers upon detecting that the vehicle is started; and transmitting a second message including the new ID.

19 Claims, 7 Drawing Sheets

(56) References Cited

U.S. PATENT DOCUMENTS

2016/0234037 A1* 8/2016 Mabuchi ................ H04L 67/12
2016/0378457 A1* 12/2016 Adachi ................... G06F 9/445
　　　　　　　　　　　　　　　　　　713/181

FOREIGN PATENT DOCUMENTS

| JP | 2012-147189 A | 8/2012 |
| JP | 2015-122732 A | 7/2015 |
| KR | 10-2007-0061654 A | 6/2007 |
| KR | 10-0887500 | 3/2009 |
| KR | 10-2012-0052240 A | 5/2012 |
| KR | 10-2014-0023799 | 2/2014 |

* cited by examiner

FIG. 7

METHOD, APPARATUS AND SYSTEM FOR DYNAMICALLY CONTROLLING SECURE VEHICLE COMMUNICATION BASED ON IGNITION

CROSS-REFERENCE TO RELATED APPLICATION

This application claims priority to and the benefit of Korean Patent Application No. 10-2015-0127356, filed on Sep. 9, 2015, which is hereby incorporated by reference as if fully set forth herein.

BACKGROUND OF THE DISCLOSURE

Technical Field

The present disclosure relates generally to secure vehicle communication, more particularly, to a method, an apparatus and a system for dynamically controlling secure vehicle communication based on ignition.

Discussion of the Related Art

Recently developed vehicles have various electronic control devices for enhancing driver convenience and safety. An in-vehicle communication network is typically used for communication among the electronic control devices. As the number of electronic control devices in a vehicle has gradually increased, and as linkage to various external devices has similarly increased, vehicle security has become a significant issue.

In this regard, an authentication procedure for an external diagnostic device is required to diagnose a vehicle controller and update data in the vehicle controller. In the authentication procedure between the vehicle controller and the external diagnostic device, when the vehicle controller transmits a seed value to the external diagnostic device in response to a request for authentication of the external diagnostic device, the external diagnostic device generates a key value using the received seed value. In this instance, the generated key value is transmitted to the vehicle controller, and the vehicle controller permits access by the external diagnostic device based on whether the key value received from the external diagnostic device is identical to a key value generated therein according to a predefined algorithm.

In most recently developed vehicles, a restrictive security function is provided only for input/output of a diagnostic signal through an on-board diagnostics (OBD) port. Representative examples of communication security schemes recently applied to vehicles include a diagnosis access authentication technology using the OBD port and a secure flash technology including an authentication mechanism and an encryption mechanism for protecting a programming process from unauthorized access and wiretapping.

However, when another communication port in the vehicle (e.g., a controller area network (CAN) communication port), other than the OBD port, or a communication line is accessed by a hacker, communication data in the vehicle may be wiretapped through the communication port. Communication hacking techniques, such as these, between vehicle controllers is a threat to vehicle security, particularly when various Internet protocol (IP) technologies are applied to the vehicle. Therefore, counteractive measures should be established.

Representative examples of symmetric cryptographic techniques which is currently used include the data encryption standard (DES), the advanced encryption standard (AES), symmetric block cipher, etc. Representative examples of asymmetric cryptographic techniques include Rivest-Shamir-Adleman (RSA), elliptic curve cryptography (ECC), etc. In general, the symmetric cryptographic technique is advantageous over the asymmetric cryptographic technique because an operation speed is higher. Thus, the symmetric cryptographic technique has been used for communication between controllers in most recently developed vehicles.

SUMMARY OF THE DISCLOSURE

Accordingly, the present disclosure is directed to a method, an apparatus and a system for dynamically controlling secure vehicle communication based on ignition that substantially obviates one or more problems due to limitations and disadvantages of the related art.

An object of the present disclosure is to provide a method, an apparatus and a system for dynamically controlling secure vehicle communication based on ignition capable of providing further enhanced communication security by generating a new public key for each network each time a vehicle is started to transmit the generated new public key to each network, and generating a new input/output ID for each controller each time the vehicle is started to allocate the generated new input/output ID to each controller. Technical problems to be solved by the present disclosure are not limited to the above-mentioned technical problems, and other technical problems not mentioned herein may be clearly understood by those skilled in the art from description below.

To achieve these objects and other advantages and in accordance with the purpose of the disclosure, as embodied and broadly described herein, a method of controlling secure vehicle communication in a vehicle gateway includes: detecting whether a vehicle is started; generating a new public key for each network connected to the vehicle gateway for message encryption upon detecting that the vehicle is started; transmitting a first message including the new public key; allocating a new identification (ID) to each controller connected to the vehicle gateway with reference to a stored routing table for message routing between controllers upon detecting that the vehicle is started; and transmitting a second message including the new ID.

The new ID may be randomly generated such that an existing message priority is not changed.

The method may further include: arbitrarily determining an offset based on a predetermined allocation range, and allocating the new ID based on the determined offset such that the existing message priority is not changed.

The routing table may maintain information about an initial ID allocated to each controller and information about the determined offset.

The routing table may further maintain at least one of: information for identifying a network corresponding to each controller and ID list information for identifying a receivable message for each controller.

The second message may include an arbitration field, a data field and a cyclic redundancy check (CRC) field, an existing ID of the controller may be inserted into the arbitration field, and the new ID may be inserted into the data field.

The data field and the CRC field may be encrypted using the new public key.

The method may further include: generating and transmitting a ghost message upon detecting that the vehicle is started. An ID included in the ghost message may be randomly generated.

The ID included in the ghost message may be generated not to overlap the new ID.

The number of transmitted ghost messages per unit time and a transmission time thereof may be dynamically determined based on network load measured in real-time.

Furthermore, according to embodiments of the present disclosure, a method of controlling secure vehicle communication in a controller connected to a vehicle gateway includes: receiving a first message including a new public key allocated to a network corresponding to the controller, receiving a second message including a new ID corresponding to the controller, decrypting the second message using the new public key to extract the new ID when an ID included in an arbitration field of the second message is included in a stored list of receivable IDs, and updating the list of receivable IDs using an existing ID stored in advance and the extracted new ID.

The first message and the second message may be generated by the vehicle gateway and transmitted to the controller each time a vehicle is started.

An offset may be determined by calculating a difference value between the existing ID and the new ID, and the list of receivable IDs may be updated using the determined offset.

Furthermore, according to embodiments of the present disclosure, a vehicle gateway connected to an in-vehicle communication network includes: a control unit detecting whether a vehicle is started, a public key generator generating a new public key for each network connected to the vehicle gateway for message encryption upon detecting that the vehicle is started, an ID generator allocating a new ID to each controller connected to the vehicle gateway with reference to a stored routing table for message routing between controllers upon detecting that the vehicle is started, and a controller area network (CAN) communication unit transmitting a first message including the new public key and a second message including the new ID.

The new ID may be randomly generated such that an existing message priority is not changed.

The ID generator may arbitrarily determine an offset based on a predetermined ID allocation range and allocate the new ID based on the determined offset such that the existing message priority is not changed.

The routing table may maintain information about an initial ID allocated to each controller and information about the determined offset.

The routing table may further maintain at least one of information for identifying a network corresponding to each controller, and ID list information for identifying a receivable message for each controller.

The second message may include an arbitration field, a data field and a CRC field, an existing ID of each controller may be inserted into the arbitration field, and the new ID may be inserted into the data field.

The vehicle gateway may further include an encryption unit encrypting the data field and the CRC field using the new public key, and a decryption unit decrypting the data field and the CRC field using the new public key.

The vehicle gateway may further include a ghost message generator generating a ghost message upon detecting that the vehicle is started. An ID included in the ghost message may be randomly generated such that the ID does not overlap the new ID.

The control unit may dynamically determine the number of transmitted ghost messages per unit time and a transmission time thereof based on network load measured in real-time.

Furthermore, according to embodiments of the present disclosure, a controller communicating with a vehicle gateway in a vehicle includes: a CAN communication unit receiving a first message including a new public key allocated to a network to which the controller is connected and a second message including a new ID corresponding to the controller, a decryption unit decrypting the second message using the new public key to extract the new ID when an ID included in an arbitration field of the second message is included in a stored list of receivable IDs, and a control unit updating the ID list using an existing ID stored in advance and the extracted new ID and storing the updated list of receivable IDs in a certain ID storage unit.

The first message and the second message may be generated by the vehicle gateway and transmitted to the controller each time the vehicle is started.

The control unit may determine an offset by calculating a difference value between the existing ID and the new ID and update the list of receivable IDs using the determined offset.

In another aspect of the present disclosure, it is possible to provide a computer-readable recording medium recording a program for executing any one of the methods of controlling secure vehicle communication described above. In another aspect of the present disclosure, it is possible to provide a recording medium recording a computer-readable program for executing any one of the methods of controlling secure vehicle communication described above.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

Reference will now be made in detail to an apparatus and various methods to which the embodiments of the present disclosure are applied. The suffixes "module" and "unit" of elements herein are used for convenience of description and thus can be used interchangeably and do not have any distinguishable meanings or functions.

Although all elements constituting the embodiments of the present disclosure are described as being integrated into a single one or operated as a single one, the present disclosure is not necessarily limited to such embodiments. According to embodiments, all of the elements may be selectively integrated into one or more and be operated as one or more within the object and the scope of the present disclosure. Each of the elements may be implemented as independent hardware. Alternatively, some or all of the elements may be selectively combined into a computer program having a program module performing some or all functions combined in one or more pieces of hardware. Code and code segments constituting the computer program may be easily reasoned by those skilled in the art to which the present disclosure pertains. The computer program may be stored in computer readable media such that the computer program is read and executed by a computer to implement embodiments of the present disclosure. Computer program storage media may include magnetic recording media, and optical recording media.

The terms "comprises", "includes", and "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings in the related art from the context. Unless obviously defined in the present disclosure, such terms are not interpreted as having ideal or excessively formal meanings.

It will be understood that, although the terms first, second, A, B, (a), (b), etc. may be used herein to describe various elements of the present disclosure, these terms are only used to distinguish one element from another element and essential, order, or sequence of corresponding elements are not limited by these terms. It will be understood that when one element is referred to as "connected to", "coupled to", or "accessing" another element, one element may be "connected to", "coupled to", or "access" another element via a further element although one element may be directly connected to or directly access another element.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit or controller. The term "control unit" or "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit or controller in conjunction with one or more other components, as would be appreciated by a person of ordinary skill in the art.

Figure 1:
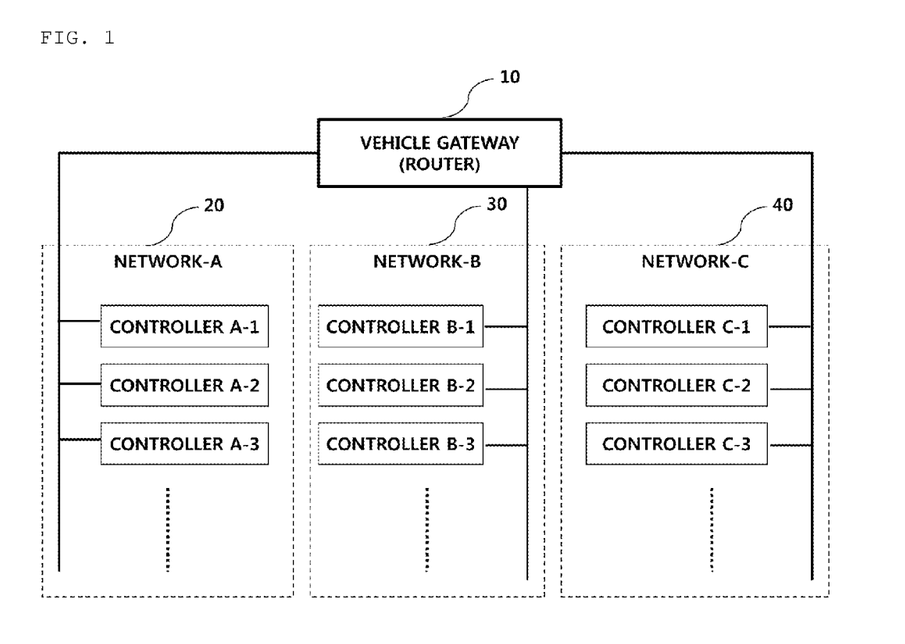
FIG. 1 is a block diagram illustrating a configuration of an in-vehicle communication system according to embodiments of the present disclosure.

Referring now to the disclosed embodiments, FIG. 1 illustrates an in-vehicle communication system according to embodiments of the present disclosure.

As shown in FIG. 1, the in-vehicle communication system may include a vehicle gateway 10 that provides a routing function during communication between controllers installed in a vehicle, and network(s) which are connected to the vehicle gateway 10 and have various domains, for example, a network A 20, a network B 30, and a network C 40. Each network or domain may include at least one controller. Examples of the domain may include a body domain, a chassis domain, a driver assistance system domain, a power train domain, a surround view domain, a head unit domain, etc. However, the present disclosure is not limited thereto, and it should be noted that a name and a type of the domain may vary according to a vehicle manufacturer and a model.

In addition, a communication scheme between the vehicle gateway 10 and the network may vary according to domain, and the in-vehicle communication system may include a plurality of vehicle gateways. For example, controller area network (CAN) communication, local interconnect network (LIN) communication, FlexRay communication, Ethernet communication, etc. are applicable to the in-vehicle communication system. However, the present disclosure is not limited thereto. For example, an in-vehicle communication network, to which a method of dynamically controlling secure vehicle communication according to the present disclosure is applied, may be suitable for a network that performs broadcast communication. However, the present disclosure is not limited thereto.

Hereinafter, description will be given using CAN communication as an example in which the network connected to the vehicle gateway 10 performs broadcast communication.

The vehicle gateway 10 according to embodiments may generate new identifications (IDs) for the controllers included in all the networks 20, 30 and 40 connected thereto each time the vehicle is started, and update a routing table using the generated new IDs. Here, each of the new IDs may correspond to information for uniquely identifying a corresponding controller in the vehicle, the gateway 10 or a corresponding network. For example, in CAN communication, the new ID may be transmitted in an output message of each controller. Each controller may identify a controller, from which a message can be received, using a new ID included in the received message. To this end, each controller may maintain ID information of controllers, from which messages are allowed to be received, that is, a list of receivable IDs. When a controller receives a message excluding an ID of a controller, from which a message is allowed to be received, the controller may discard the received message.

In general, a CAN communication bus does not include a master that controls all nodes when each node, that is, an electronic control unit (ECU) or a controller accesses data moving through the CAN bus to perform a read or write operation. Therefore, when each node is prepared to transmit data, each node may transmit a CAN frame to the network after verifying whether a CAN bus line is in use. In this instance, the transmitted CAN frame neither includes an address of a transmission node nor an address of a reception node. Instead, an ID for uniquely identifying the controller that transmits the CAN frame is transmitted in the CAN frame.

When the respective nodes attempt to simultaneously transmit messages on the CAN bus, a node having top priority, for example, a node having a lowest arbitration ID may automatically access the bus. An arbitration ID currently in use in CAN communication has a length of 11 bits (CAN 2.0 Part A) or 29 bits (CAN 2.0 Part B). In other words, the ID of the CAN frame may be used to identify content of a message and to identify a priority of the message. For example, an allocation range of a controller ID may be 0x000h to 0x7ffh or 0x000h to 0x6ffh in an application message, and may be 0x700h to 0x7ffh in a diagnostic message. However, the present disclosure is not limited thereto, and it should be noted that the allocation range may vary according to length of an arbitration ID field and/or vehicle manufacturer and model.

The vehicle gateway 10 according to embodiments may generate a new ID for each controller such that priorities are not changed at the time of arbitration between CAN signals.

In this case, each controller may identify a receivable controller ID according to ID update based on an offset value between an existing ID and a new ID. For example, when a new ID of a first controller allocated by the vehicle gateway 10 is 5 in a state in which an existing ID allocated to the first controller is 1 and IDs of controllers, from which messages can be received, are 4 and 5, an offset value may be 4 corresponding to a difference between the new ID and the existing ID. In this case, IDs of controllers, from which messages can be received, may be 8 and 9. Therefore, when a controller according to an embodiment of the present disclosure receives a new ID by the vehicle gateway 10, the controller may identify IDs of controllers, from which messages can be received, by calculating an offset value between an existing ID and the new ID without a need to separately receive a list of the IDs of the controllers.

When an ID is initially allocated to a controller, the vehicle gateway 10 may transmit, to the controller, a list of IDs for identifying controllers, from which messages can be received, by the controller. For example, when the vehicle gateway 10 needs to transmit a new ID generated in response to a vehicle being started to a controller, the vehicle gateway 10 may transmit the new ID to the controller by inserting an existing ID into an arbitration field of the CAN frame header and inserting the new ID into a data field of the CAN frame.

However, when priorities are not changed for arbitration between CAN signals, if a hacker acquires the CAN frame for each network each time a vehicle is started and aligns IDs included in the acquired CAN frame according to the priorities, there is a high probability that the hacker may recognize the IDs allocated to the controller even when the IDs are randomized each time the vehicle is started.

To solve the above-mentioned problem, i.e., in order to prevent the hacker from easily analyzing the IDs of the controllers by making a certain ID allocation order confused, the vehicle gateway 10 according to the present embodiment may generate a certain ghost message and transmit the ghost message to each network after updating the IDs of the controllers, that is, after generating new IDs.

The IDs included in the ghost message may be randomly generated without considering priorities. In addition, the ghost message may be transmitted at certain intervals or at a random point in time rather than a certain interval. Further, a length of the ghost message may be changed each time transmission is performed. Furthermore, data included in the ghost message may be random data. In this instance, the length of the ghost message and the number of messages transmitted per unit time may be determined based on a bus load of the network. Preferably, the length of the ghost message and the number of messages transmitted per unit time are determined such that influence on communication between controllers by transmission of the ghost message is minimized.

In addition, the vehicle gateway 10 according to the present embodiment may generate a new public key for each network for data encryption each time the vehicle is started, and provide the new public key to a controller. Data encryption may be performed only for a cyclic redundancy check (CRC) field for checking errors and a data field of the CAN frame.

A transmitting end may encrypt the CAN frame using the new public key, and then carry the encrypted CAN frame on the bus. A receiving end may decrypt the encrypted CAN frame using the new public key. The receiving end may check errors using CRC of the decrypted CAN frame, and discard the message when the message contains an error. The hacker may maliciously forcibly transmit an arbitrary message to a particular network to disrupt normal operation of the vehicle or illegally acquire controller information. Therefore, encryption of the CAN frame data and CRC using the new public key may be effective in secure vehicle communication.

The above embodiments describe that the vehicle gateway 10 generates and transmits a new ID for a controller each time the vehicle is started, and then generates and transmits a new public key for each network. However, this embodiment is merely an example. Additionally, according to embodiments of the present disclosure, the vehicle gateway 10 may generate and transmit a new public key for each network each time the vehicle is started, and then transmit a new ID encrypted using the new public key.

Figure 2:
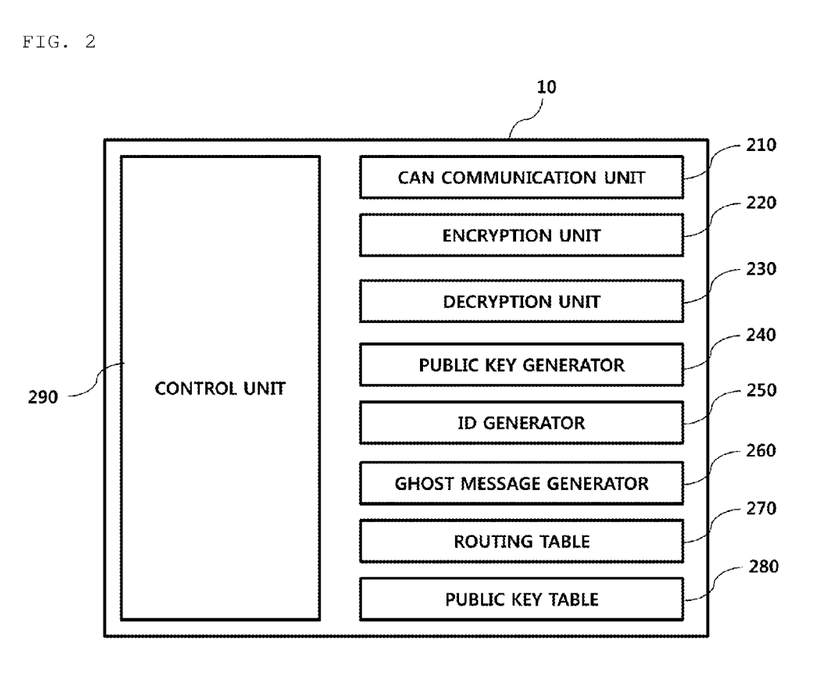
FIG. 2 is a block diagram illustrating an internal configuration of a vehicle gateway according to embodiments of the present disclosure.

FIG. 2 shows an internal configuration of the vehicle gateway 10 according to embodiments of the present disclosure.

As shown in FIG. 2, the vehicle gateway 10 may include a CAN communication unit 210, an encryption unit 220, a decryption unit 230, a public key generator 240, an ID generator 250, a ghost message generator 260, a routing table 270, a public key table 280, and a control unit 290. The configuration of the vehicle gateway 10 is not essential, and thus it should be noted that the vehicle gateway 10 may include less or more components.

The CAN communication unit 210 may provide a function of transmitting or receiving a CAN frame by monitoring the CAN bus line.

The encryption unit 220 may provide a function of encrypting a CAN frame to be transmitted using a public key allocated to each network. For example, the encryption unit 220 may encrypt the CRC field and the data field of the CAN frame using the public key. However, the present disclosure is not limited thereto.

The decryption unit 230 may provide a function of decrypting the encrypted CAN frame using the public key allocated to each network upon reception of the CAN frame.

The public key generator 240 may provide a function of generating a new public key for each network each time the vehicle is started according to a control signal of the control unit 290. In this instance, the public key table 280 may be updated with the generated new public key, and the generated new public key may be transmitted through a certain CAN frame for each network.

The ID generator 250 may determine an offset for generation of a new ID each time the vehicle is started according to the control signal of the control unit 290, and generate a new ID for each controller corresponding to the determined offset and the routing table 270. In this instance, the routing table 270 may be updated with the generated new ID, and the generated new ID may be transmitted to a controller using an existing ID of the controller. For example, the existing ID may be inserted in an arbitration field of the CAN frame, and the new ID may be inserted into the data field thereof. In addition, the CAN frame including the new ID may be transmitted after being encrypted using the previously transmitted new public key. However, the present disclosure is not limited thereto.

In particular, the ID generator 250 according to embodiments may generate the new ID with reference to the routing table 270 such that existing priorities of controllers are maintained.

The ghost message generator 260 may generate the ghost message including IDs randomly generated according to the control signal of the control unit 290. Here, the ghost message corresponds to a CAN frame, and the IDs included in the ghost message may be randomly generated without taking priorities into consideration. In addition, the ghost message may be transmitted at certain intervals or at a random point in time rather than a certain interval. Further, a length of the ghost message may be changed each time transmission is performed. Furthermore, data included in the ghost message may be random data. In this instance, the length of the ghost message and the number of messages transmitted per unit time may be determined based on a bus load of the network. Preferably, the length of the ghost message and the number of messages transmitted per unit time are determined such that influence on communication between controllers by transmission of the ghost message is minimized. In addition, the ghost message generator 260 may be determined such that an ID allocation range for the ghost message does not overlap an ID allocation range for a normal controller. However, the present disclosure is not limited thereto. In addition, the CAN frame generated by the ghost message generator 260 may not be encrypted using the public key. However, the present disclosure is not limited thereto.

The routing table 270 may maintain network identification information for identifying a network to which a controller is connected, and existing IDs and new IDs allocated to respective controllers. In this instance, the existing IDs and new IDs allocated to respective controllers may be aligned and maintained according to priorities allocated to respective controllers. Additionally, according to embodiments of the present disclosure, the routing table 270 may maintain network identification information for identifying a network to which a controller is connected and offset information used to allocate an initial ID and a new ID allocated to each controller. In addition, the routing table 270 may maintain a list of IDs corresponding to receivable messages for respective controllers, that is, a list of controllers, from which messages are allowed to be received.

The public key table 280 may maintain a new public key allocated to each network.

The control unit 290 may control overall operation and an input/output of the vehicle gateway 10. In particular, the control unit 290 may control lower modules such that a new ID and a new public key are generated each time the vehicle is started. In addition, the control unit 290 may measure network load of real-time CAN communication, and adaptively determine the number of ghost messages transmitted per unit time and a length of data included in the ghost message, that is, a ghost message transmission time based on the measured load.

For example, the vehicle gateway 10 may read an ID included in the arbitration field of the received CAN frame, and identify a network corresponding to the read ID with reference to the routing table 270. Thereafter, the vehicle gateway 10 may extract a public key corresponding to the identified network with reference to the public key table 280, and decrypt the encrypted CAN frame using the extracted public key.

Figure 3:
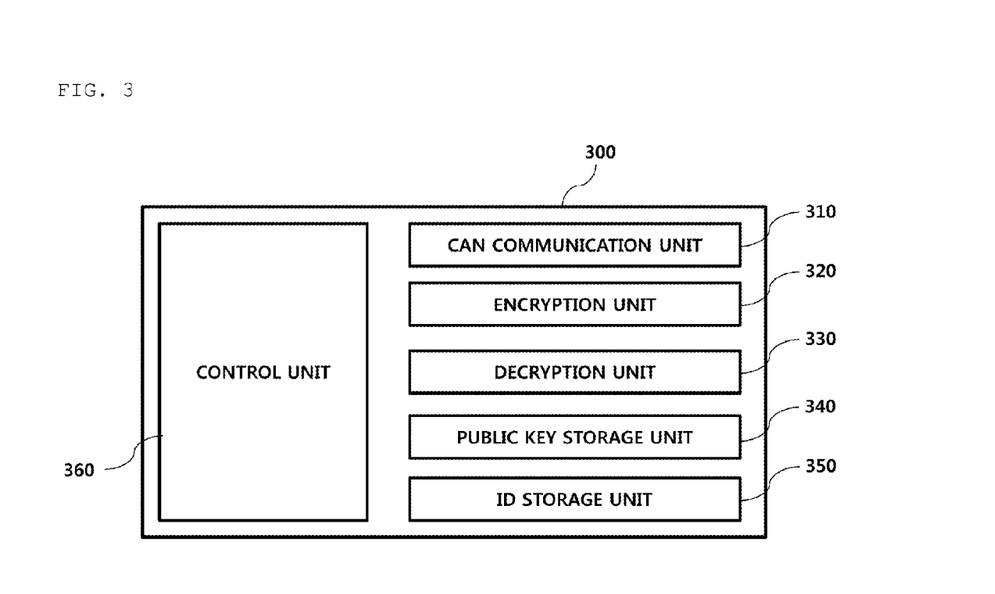
FIG. 3 is a block diagram illustrating an internal configuration of a controller installed in a vehicle according to embodiments of the present disclosure.

FIG. 3 shows an internal configuration of a controller or an ECU installed in the vehicle according to embodiments of the present disclosure.

As shown in FIG. 3, a controller 300 may include a CAN communication unit 310, an encryption unit 320, a decryption unit 330, a public key storage unit 340, an ID storage unit 350 and a control unit 360.

The CAN communication unit 310 may provide a function of transmitting or receiving a CAN frame by monitoring the CAN bus line.

The encryption unit 320 may provide a function of encrypting a CAN frame to be transmitted using a public key allocated to each network. For example, the encryption unit 320 may encrypt the CRC field and the data field of the CAN frame using the public key. However, the present disclosure is not limited thereto.

The decryption unit 330 may provide a function of decrypting the encrypted CAN frame using the public key allocated to each network upon reception of the CAN frame.

The public key storage unit 340 may maintain a new public key received from the vehicle gateway 10 each time the vehicle is started.

The ID storage unit 350 may maintain an ID initially allocated to a controller (hereinafter referred to as an "existing ID"), a new ID received from the vehicle gateway 10 each time the vehicle is started, a list of IDs of controllers, from which messages can be received, an offset value between the existing ID and the new ID, etc.

The control unit 360 may control overall operation and an input/output of the controller 300.

In particular, the control unit 360 may calculate the offset value between the existing ID and the new ID, generate the list of IDs of controllers, from which messages can be received, based on the calculated offset value, and store the generated ID list in the ID storage unit 350.

Figure 4:
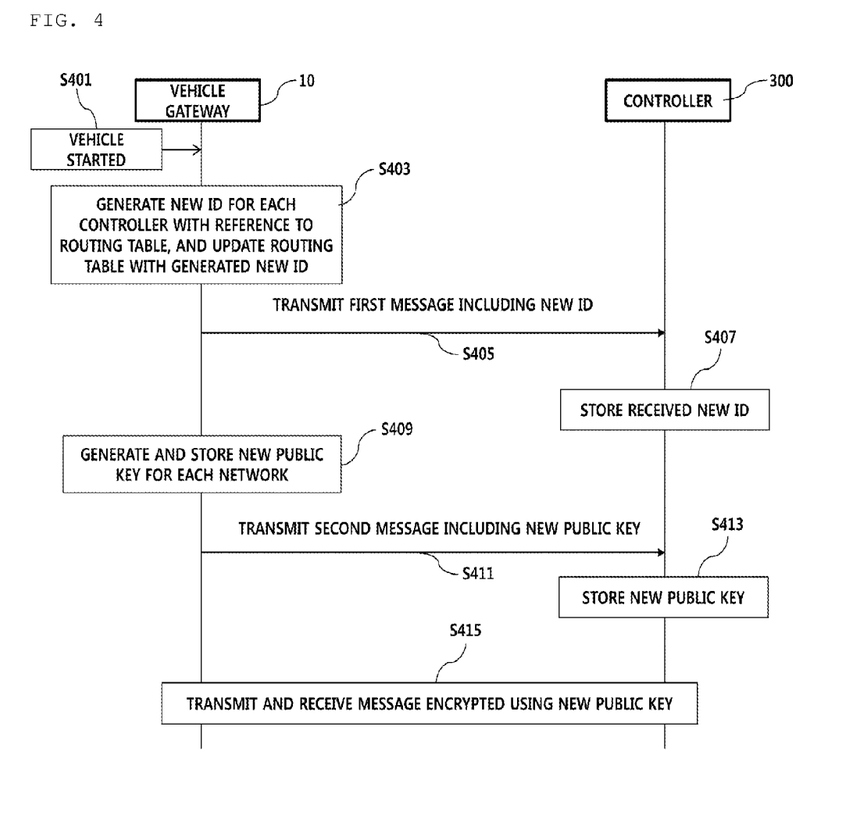
FIG. 4 is a flowchart illustrating a method of dynamically controlling secure vehicle communication according to embodiments of the present disclosure.

FIG. 4 illustrates a method of dynamically controlling secure vehicle communication according to embodiments of the present disclosure.

As shown in FIG. 4, in S401 to S403, upon detecting that the vehicle is started, the vehicle gateway 10 may generate a new ID for each controller with reference to a routing table, and update the routing table with the generated new ID. The vehicle gateway 10 may randomly generate new IDs for respective controllers such that priorities allocated to the respective controllers are maintained. To this end, the vehicle gateway 10 may randomly determine an offset value for generation of a new ID each time the vehicle is started. Here, a range of the randomly selected offset value may be adaptively determined based on the number of controllers connected to the vehicle gateway 10, a length of the arbitration field of the CAN frame, that is, an allocation range of a controller ID, etc.

In S405, the vehicle gateway 10 may generate a certain CAN frame including the generated new ID (hereinafter referred to as a "first message"), and transmit the first message on the bus line. Here, the existing ID of the controller may be inserted into the arbitration field of the first message, and the new ID may be inserted into the data field thereof. Therefore, upon reception of the first message, the controller 300 may verify whether the first message is a message that can be received by the controller 300 by reading the arbitration field.

In S407, the controller 300 may read the new ID from the received first message, and store the read new ID in a certain recording area.

Thereafter, in S409 to S411, the vehicle gateway 10 may generate a new public key for each network and record the generated new public key on a certain public key table, and then transmit a certain CAN frame including the new public key (hereinafter referred to as a "second message") to the network. Here, the new public key may be inserted into a data field of the second message.

In S413, upon reception of the second message, the controller 300 may read the new public key from the second message, and store the read new public key in a certain recording area.

Thereafter, the vehicle gateway 10 and the controller 300 may transmit and receive messages encrypted using the new public key.

Even though FIG. 4 illustrates only a procedure of allocating the new ID and the new public key between the vehicle gateway 10 and the controller 300, this procedure is merely an example. It should be noted that encrypted CAN communication can also be performed between controllers using the new ID and the new public key allocated by the vehicle gateway 10 according to embodiments of the present disclosure.

Figure 5:
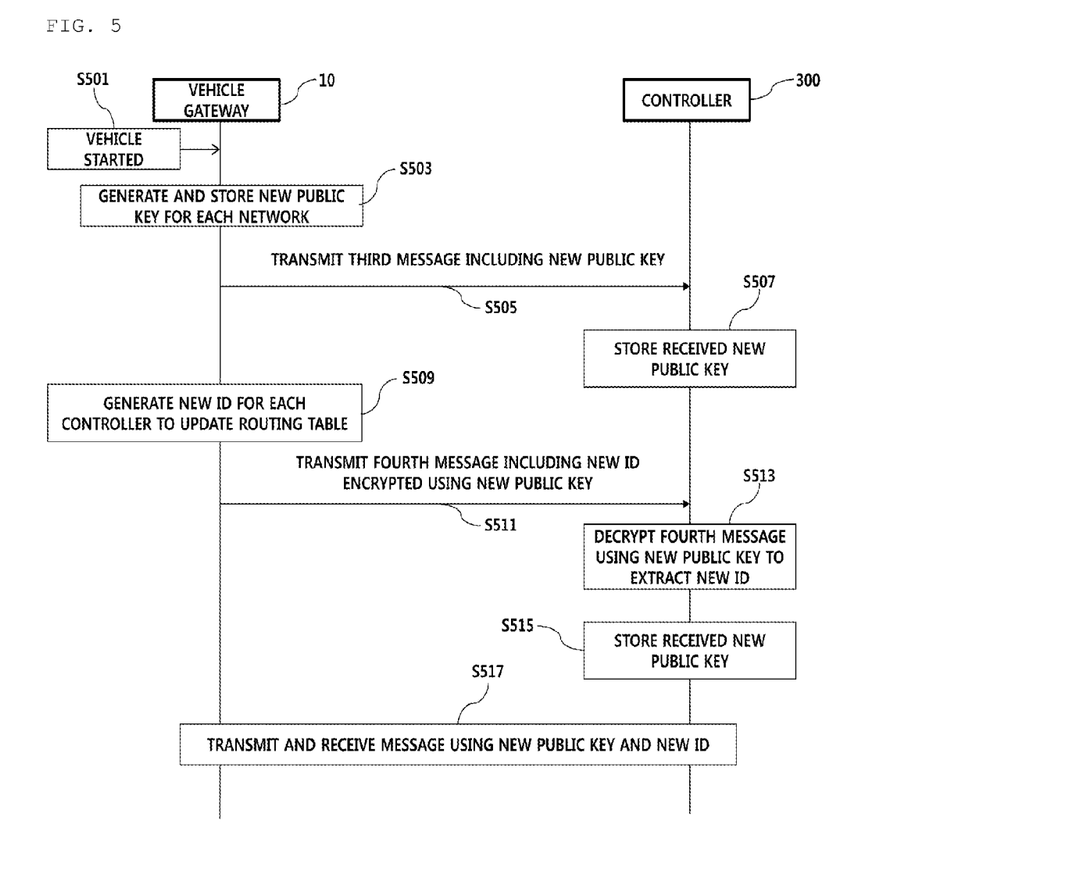
FIG. 5 is a flowchart illustrating a method of dynamically controlling secure vehicle communication according to embodiments of the present disclosure.

FIG. 5 illustrates a method of dynamically controlling secure vehicle communication according to embodiments of the present disclosure.

As shown in FIG. 5, in S501 to S503, upon detecting that the vehicle is started, the vehicle gateway 10 may generate a new public key for each network and store the generated new public key in a certain public key table.

In S505, the vehicle gateway 10 may transmit a certain CAN frame including the new public key for each network (hereinafter referred to as a "third message") on the bus line.

In S507, upon reception of the third message, the controller 300 may read the new public key from the third message and store the read new public key in a certain recording area.

Subsequently, in S509, the vehicle gateway 10 may generate a new ID for each controller to update a certain routing table.

In S511, the vehicle gateway 10 may encrypt the new ID using the new public key corresponding to the network of the controller, and then transmit a certain CAN frame including the encrypted new ID (hereinafter referred to as a "fourth message"). Here, an existing ID of the controller may be inserted into an arbitration field of the fourth message, and the new ID may be inserted into a data field thereof.

In S513, the controller 300 may extract the new ID by decrypting the fourth message received using the previously received new public key. In this instance, in S515, the extracted new ID may be recorded in a certain ID storage unit.

Thereafter, in S517, the vehicle gateway 10 and the controller 300 may transmit and receive messages encrypted using the new public key and the new ID.

Even though FIG. 5 illustrates only a procedure of allocating the new public key and the new ID between the vehicle gateway 10 and the controller 300, this procedure is merely an example. It should be noted that encrypted CAN communication can also be performed between controllers using the new public key and the new ID allocated by the vehicle gateway 10 according to embodiments of the present disclosure.

In particular, the method of controlling secure vehicle communication described with reference to FIG. 5 is advantageous over the method described with reference to FIG. 4 in that security of the new ID may be strengthened since the new ID generated by the vehicle gateway 10 is encrypted using the new public key and then transmitted to the controller 300.

Figure 6:
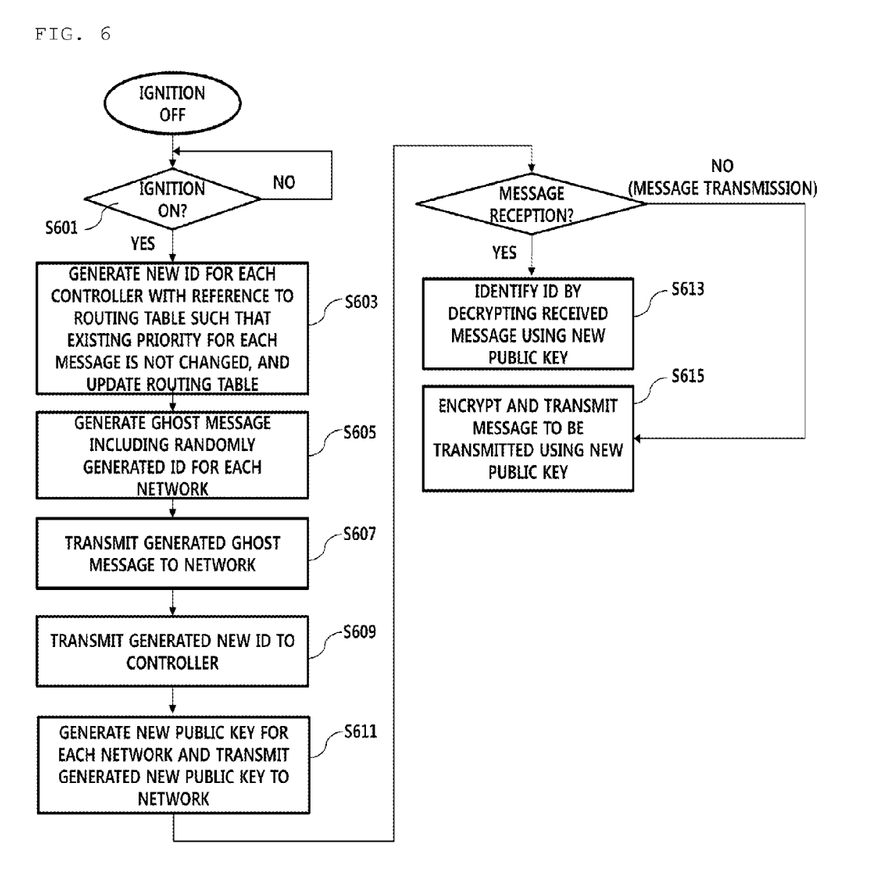
FIG. 6 is a flowchart illustrating a method of controlling secure vehicle communication in the vehicle gateway according to embodiments of the present disclosure.

FIG. 6 illustrates a method of controlling secure vehicle communication in the vehicle gateway 10 according to embodiments of the present disclosure.

As shown in FIG. 6, in S601 to S603, in response to switching from an ignition OFF state to an ignition ON state, the vehicle gateway 10 may generate a new ID for each controller with reference to a routing table such that an existing priority of each message is not changed to update the routing table.

In S607, the vehicle gateway 10 may generate a ghost message including a randomly generated ID for each network, and transmit the generated ghost message to the network. In this instance, the ID included in the ghost message may be randomly generated without considering the existing priority of each message. In addition, the ghost message may be transmitted at certain intervals or transmitted at a random point in time rather than a certain interval. Further, a length of the ghost message may be changed each time transmission is performed. Furthermore, data included in the ghost message may be random data. In this instance, the length of the ghost message and the number of messages transmitted per unit time may be determined based on a bus load of the network. Preferably, the length of the ghost message and the number of messages transmitted per unit time are determined such that influence on communication between controllers by transmission of the ghost message is minimized In S609 to S611, the vehicle gateway 10 may transmit the new ID generated in S603 to the controller, and then generate a new public key for each network to transmit the generated new public key to the network.

In S613, upon reception of a message, the vehicle gateway 10 may identify an ID by decrypting the received message using the new public key.

In S615, when the vehicle gateway 10 needs to transmit a message, the vehicle gateway 10 may encrypt the message to be transmitted using the new public key and transmit the encrypted message.

Figure 7:
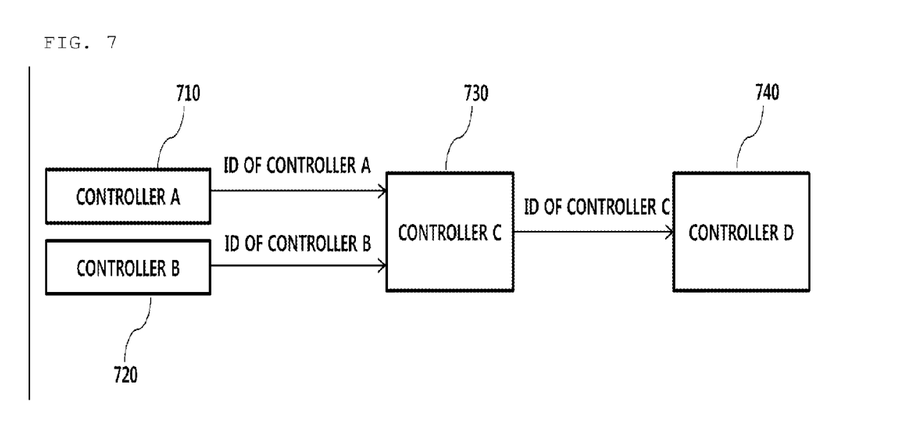
FIG. 7 is a block diagram illustrating an ID included in a controller input/output message according to embodiments of the present disclosure.

FIG. 7 illustrates an ID included in an input/output message of a controller according to embodiments of the present disclosure.

As shown in FIG. 7, when a controller A 710 and a controller B 720 have messages to be transmitted to a controller C 730, the controller A 710 and the controller B 720 may generate and transmit messages including IDs allocated thereto. The controller C 730 may verify whether a received ID is an ID receivable by the controller C 730 by verifying an arbitration field included in a received message. The controller C 730 may receive the message when the received ID is an ID receivable by the controller C 730, and discard the message when the received ID is a receivable ID.

When the controller C 730 has a message to be transmitted to a controller D 740, the controller C 730 may transmit a message including an ID allocated thereto. In this instance, a transmission message of each controller may be encrypted using a public key allocated in advance by the vehicle gateway 10 and transmitted, and a reception message of each controller may be decrypted using a public key allocated in advance by the vehicle gateway 10.

Effects of the method and apparatus of the present disclosure are described below.

The present disclosure has an advantage of providing a method, an apparatus and a system for dynamically controlling secure vehicle communication based on ignition. In addition, the present disclosure generates a new public key for each network each time a vehicle is started to transmit the generated new public key to each network, and generates a new input/output ID for each controller each time the vehicle is started to allocate the generated new input/output ID to each controller, thereby having an advantage of providing a method, an apparatus and a system for dynamically controlling secure vehicle communication based on ignition capable of providing further enhanced communication security.

Further, the present disclosure has an advantage of providing a vehicle communication system having reinforced security in which, even when CAN data is acquired by a third party, the acquired data is not easily analyzed using an existing symmetric-key based encryption algorithm and controller information is not easily wiretapped by randomizing IDs used for CAN communication. Even further, the present disclosure has an advantage of providing vehicle communication having further reinforced security using an existing communication protocol without replacing hardware and changing a communication protocol.

Effects that may be obtained from the present disclosure are not limited to the above-mentioned effects, and other effects not mentioned herein may be clearly understood by those skilled in the art from the above description. The present disclosure may be embodied in other specific forms without departing from the spirit and characteristics of the present disclosure. Thus, the descriptions herein are to be considered in all respects as illustrative and not restrictive. The scope of the present disclosure should be determined by reasonable interpretation of the appended claims and all change which falls within the equivalent scope of the disclosure are included in the scope of the disclosure.

What is claimed is:

1. A method of controlling secure vehicle communication in a vehicle gateway, the method comprising:
   detecting whether a vehicle is started;
   generating a new public key for each network connected to the vehicle gateway for message encryption upon detecting that the vehicle is started;
   transmitting a first message including the new public key;
   allocating a new identification (ID) to each controller connected to the vehicle gateway with reference to a stored routing table for message routing between controllers upon detecting that the vehicle is started; and
   transmitting a second message including the new ID,
   wherein the new ID is randomly generated such that an existing message priority is not changed using an offset which is determined arbitrarily based on a predetermined allocation range.

2. The method according to claim 1, wherein the routing table maintains information about an initial ID allocated to each controller and information about the determined offset.

3. The method according to claim 2, wherein the routing table further maintains at least one of:
   information for identifying a network corresponding to each controller, and
   ID list information for identifying a receivable message for each controller.

4. The method according to claim 1, wherein:
   the second message includes an arbitration field, a data field and a cyclic redundancy check (CRC) field,
   an existing ID of each controller is inserted into the arbitration field, and
   the new ID is inserted into the data field.

5. The method according to claim 4, wherein the data field and the CRC field are encrypted using the new public key.

6. The method according to claim 1, further comprising:
   generating and transmitting a ghost message upon detecting that the vehicle is started,
   wherein an ID included in the ghost message is randomly generated.

7. The method according to claim 6, wherein the ID included in the ghost message is generated not to overlap the new ID.

8. The method according to claim 6, wherein the number of transmitted ghost messages per unit time and a transmission time thereof are dynamically determined based on network load measured in real-time.

9. A method of controlling secure vehicle communication in a controller connected to a vehicle gateway, the method comprising:
   receiving a first message including a new public key allocated to a network corresponding to the controller;
   receiving an encrypted second message including a new ID corresponding to the controller;
   decrypting the encrypted second message using the new public key to extract the new ID when an ID included in an arbitration field of the encrypted second message is included in a stored list of receivable IDs; and
   updating the list of receivable IDs using an existing ID stored in advance and the extracted new ID,
   wherein the controller determines an offset by calculating a difference value between the existing ID and the new ID, and updates the list of receivable IDs using the determined offset.

10. The method according to claim 9, wherein the first message and the encrypted second message are generated by the vehicle gateway and transmitted to the controller each time a vehicle is started.

11. A vehicle gateway connected to an in-vehicle communication network, comprising:
    a control unit detecting whether a vehicle is started;
    a public key generator generating a new public key for each network connected to the vehicle gateway for message encryption upon detecting that the vehicle is started;
    an ID generator allocating a new ID to each controller connected to the vehicle gateway with reference to a stored routing table for message routing between controllers upon detecting that the vehicle is started; and a controller area network (CAN) communication unit transmitting a first message including the new public key and a second message including the new ID, wherein the new ID is randomly generated such that an existing message priority is not changed using an offset which is determined arbitrarily based on a predetermined allocation range.

12. The vehicle gateway according to claim 11, wherein the routing table maintains information about an initial ID allocated to each controller and information about the determined offset.

13. The vehicle gateway according to claim 12, wherein the routing table further maintains at least one of information for identifying a network corresponding to each controller, and ID list information for identifying a receivable message for each controller.

14. The vehicle gateway according to claim 11, wherein:

the second message includes an arbitration field, a data field and a CRC field, an existing ID of each controller is inserted into the arbitration field, and the new ID is inserted into the data field.

15. The vehicle gateway according to claim 14, further comprising:

an encryption unit encrypting the data field and the CRC field using the new public key; and a decryption unit decrypting the data field and the CRC field using the new public key.

16. The vehicle gateway according to claim 11, further comprising:

a ghost message generator generating a ghost message upon detecting that the vehicle is started, wherein an ID included in the ghost message is randomly generated such that the ID does not overlap the new ID.

17. The vehicle gateway according to claim 16, wherein the control unit dynamically determines the number of transmitted ghost messages per unit time and a transmission time thereof based on network load measured in real-time.

18. A controller communicating with a vehicle gateway in a vehicle, comprising:

a CAN communication unit receiving a first message including a new public key allocated to a network to which the controller is connected and encrypted second message including a new ID corresponding to the controller;

a decryption unit decrypting the encrypted second message using the new public key to extract the new ID when an ID included in an arbitration field of the encrypted second message is included in a stored list of receivable IDs; and a control unit updating the ID list using an existing ID stored in advance and the extracted new ID and storing the updated list of receivable IDs in a certain ID storage unit, wherein the control unit determines an offset by calculating a difference value between the existing ID and the new ID, and updates the list of receivable IDs using the determined offset.

19. The controller according to claim 18, wherein the first message and the encrypted second message are generated by the vehicle gateway and transmitted to the controller each time the vehicle is started.

* * * * *